(12) United States Patent
Fillingim

(10) Patent No.: US 12,336,463 B1
(45) Date of Patent: Jun. 24, 2025

(54) WIRELESS PLANT CONTAINER WITH VACUUM SEALING FOR SUB-IRRIGATED SELF-WATERING CONTROLLED BY SOIL MOISTURE AND WATER LEVEL SENSORS

(71) Applicant: Herba Grown, Inc., San Francisco, CA (US)

(72) Inventor: Kasey Fillingim, San Francisco, CA (US)

(73) Assignee: Herba Grown, Inc., San Francisco, CA (US)

( * ) Notice: Subject to any disclaimer, the term of this patent is extended or adjusted under 35 U.S.C. 154(b) by 0 days.

(21) Appl. No.: 18/777,626

(22) Filed: Jul. 19, 2024

Related U.S. Application Data

(60) Provisional application No. 63/520,664, filed on Aug. 21, 2023.

(51) Int. Cl.
*A01G 27/02* (2006.01)
*A01G 27/00* (2006.01)

(52) U.S. Cl.
CPC ........... *A01G 27/02* (2013.01); *A01G 27/003* (2013.01); *A01G 27/008* (2013.01)

(58) Field of Classification Search
None
See application file for complete search history.

(56) References Cited

U.S. PATENT DOCUMENTS

| | | | |
|---|---|---|---|
| 3,758,987 A * | 9/1973 | Crane | A01G 27/00 47/38.1 |
| 2018/0125022 A1* | 5/2018 | Moran | A01G 27/00 |
| 2020/0267917 A1* | 8/2020 | Hulday | A01G 27/06 |
| 2024/0164266 A1* | 5/2024 | Burgess | A01G 31/02 |

\* cited by examiner

*Primary Examiner* — Joshua J Michener
*Assistant Examiner* — Henry Hooper Mudd
(74) *Attorney, Agent, or Firm* — Westborough IP Group, LLC

(57) ABSTRACT

A self-watering plant container includes a reservoir in a cavity of an outside wall of the container and having an inner wall that holds soil for plants placed in the plant container, a plurality of openings in a bottom portion of the inner wall, and an automatically actuatable air valve disposed in a top portion of the reservoir. Opening the air valve causes water from the reservoir to flow through the openings to increase a moisture content of the soil and closing the air valve causes negative air pressure to act on the water to prevent the water from flowing through the openings. The self-watering plant container also includes a motherboard with firmware that operates the air valve and a display that displays status information and instructions for a user. A cloud service communicates with the motherboard to provide signals that cause the motherboard to actuate the air valve.

17 Claims, 4 Drawing Sheets

WIRELESS PLANT CONTAINER WITH VACUUM SEALING FOR SUB-IRRIGATED SELF-WATERING CONTROLLED BY SOIL MOISTURE AND WATER LEVEL SENSORS

CROSS-REFERENCE TO RELATED APPLICATIONS

This application claims priority to U.S. Prov. App. No. 63/520,664, filed on Aug. 21, 2023, and entitled "WIRELESS PLANT POT WITH VACUUM SEALING FOR SELF-WATERING CONTROLLED BY AIR VALVE, SOIL MOISTURE AND WATER LEVEL SENSORS", which is incorporated herein by reference.

TECHNICAL FIELD

This application is directed to the field of wireless devices and automated control systems for plant care, and more particularly to the field of controlling wireless plant containers with self-watering functionality based on vacuum sealing with an air valve, and with soil moisture and water level sensors.

BACKGROUND OF THE INVENTION

The market for outdoor plants and planters, a segment of the world's largest $180 billion US Landscaping Market, is expected to grow at a compound annual growth rate (CAGR) of 6.7% from 2024 to 2030; market analysts project the size of garden planter market to reach $6.5-$6.8 billion by the year 2030.

Multiple lifestyle trends, such as the trend toward sustainable and eco-friendly living, toward outdoor leisure, and toward the creation of functional and aesthetically pleasing garden spaces, along with the growing interest in gardening and with other evolving consumer preferences are some of the key factors driving the growth of the garden planter market in the U.S. Garden planters play a vital role in promoting urban gardening and landscaping. As an example, the United States Environmental Protection Agency has launched the Greening America's Communities program, the initiative aiding cities and towns in developing and implementing realistic visions for environmentally friendly neighborhoods incorporating innovative green infrastructures.

Vendors, market analysts, practitioners, and customers underscore numerous benefits of contemporary outdoor planters. Available in a variety of sizes, designs, and materials, outdoor planters create a variety of unique aesthetic views and utilities, from the popular vase shapes to integration with benches, walls, fences, and other parts of the garden environment and integration of plants even into heavily urbanized city environments. Outdoor planters make the plants portable and convert garden designs into mobile structures adaptable to other changes in the landscape. They create affordable and aesthetically pleasing barriers around and through various types of commercial and private property. Larger planter bowls have enough space for a tree to provide shade in a contemporary garden. Outdoor planters protect ornamental plants from destruction, weeds, and other invasive plants. They increase the resale value of real estate and help attract more customers to a brick-and-mortar business. Additionally, advanced outdoor planters provide economy of water and time through their self-watering features.

The U.S. outdoor (garden) planter market segmentation is primarily based on end use, material, distribution channel, advanced feature set, and region. The three main types of outdoor planter materials are terracotta or ceramics, plastics, and wood. There is a growing utilization of recycled and upcycled materials in the construction of planters due to customer requirements of sustainability, durability, and aesthetic benefits. These requirements promote the use of the eco-friendly recycled plastics, reclaimed wood, or composite; there is also an increasing demand for materials that are durable, lightweight, portable and resilience against varying weather conditions, such as resin and fiberglass.

Key players in the US garden planter market include THE HC COMPANIES, INC., Bloem, Crescent Garden Company, Mayne, Tusco Products, Planters Unlimited, Urban Pot, Palmer Planter Company, Tournesol, and many more. Advanced features of outdoor planters may include a water level indicator (such as in Crescent TruDrop Planters) and various types of drains. Many types and brands of add-ons for sub-irrigation support and for soil moisture measurements are available. One prominent type of outdoor sub-irritation planter uses sealed reservoirs and an automatic watering cycle is represented by the Tournesol CWI Container Irrigation Insert product line, which combines the commercial success with a simple efficient construction.

SUMMARY OF THE INVENTION

Notwithstanding significant progress in the development of sub-irrigation self-watering outdoor planters, multiple unsolved issues remain. The majority of existing solutions are not adaptable to specific plant profiles and use the same settings for different categories of houseplants. In addition, existing models do not integrate soil moisture sensors into automatic self-watering cycles, do not have notification and alert mechanisms to request water refill for the reservoirs and are not protected from an occasional use of unsuitable liquids that may harm plants.

Accordingly, it is important to develop semi-automatic self-watering plant containers with user friendly controls and alerts of water levels in tanks and with protection against user errors in refilling, adaptable to broad range of plant profiles.

According to the system described herein, a self-watering plant container includes a reservoir disposed in a cavity of an outside wall of the container and having an inner wall that holds soil for one or more plants placed in the plant container, a plurality of openings in a bottom portion of the inner wall of the reservoir, and an automatically actuatable air valve disposed in a top portion of the reservoir. Opening the air valve causes water from the reservoir to flow through the openings to increase a moisture content of the soil and closing the air valve causes negative air pressure to act on the water to prevent the water from flowing through the openings. The self-watering plant container also includes a motherboard, coupled to the air valve and having a processor thereon with firmware that causes the air valve to open and close and having a display that displays system status information and instructions for a user and a cloud service that communicates with the motherboard to provide signals thereto that cause the motherboard to open and close the air valve. The self-watering plant container may also include at least one moisture sensor that provides a signal to the motherboard indicating a moisture content of the soil. The air valve may be opened or closed based in part on the moisture content and on a profile of the one or more plants placed in the plant container. The moisture content may be determined to be sufficient or insufficient based on the profile and wherein the profile is stored in the cloud service. Data from the moisture sensor may be transmitted by the motherboard to the cloud service. The cloud service may provide a signal to the motherboard to open the air valve in response to the moisture content being insufficient. The motherboard may provide the signal to open the air valve. The cloud service may provide a signal to the motherboard to close the air valve in response to the moisture content being sufficient. The motherboard may provide the signal to close the air valve. The self-watering plant container may also include at least one other sensor that provides signals to the motherboard, where the at least one other sensor is a light sensor, a temperature sensor, and/or a humidity sensor and where the motherboard provides the signals to the cloud service indicating one or more measured values from the at least one other sensor. The cloud service may include an analytics component that determines an acceptable zone of operation for one or more plants in the plant container based on the moisture content of the soil, environmental factors provided by the at least one other sensor, and/or a profile of the one or more plants in the plant container. The analytics component may cause the motherboard to open the air valve in response to determining that the moisture content of the soil is outside the acceptable zone of operation and may cause the motherboard to close the air valve in response to determining that the moisture content of the soil is within the acceptable zone of operation. The analytics component may monitor frequency and durations of water cycles and build real-time models of irregularities in water cycles and consumed water quantities, map irregularities in water cycles and consumed water quantities on the profile of the one or more plants in the plant container and the signals from the at least one other sensor and generate recommendations that include adaptation to outdoor climatic conditions, adaptation to outdoor lighting conditions, improvements of room climate, improvements of room lighting, and/or alternative plant care methods. The self-watering plant container may also include a water level sensor that indicates a water level of the reservoir. The display of the motherboard or a mobile application that communicates with the cloud service may prompt a user to add water to the reservoir in response to a signal from the water level sensor indicating an insufficient amount of water in the reservoir. The reservoir may include either a filling tube or a filling hole disposed at a top portion of the reservoir to facilitate the user adding water to the reservoir and the water level sensor may provide a signal when filling is complete. The self-watering plant container may also include an emergency water valve, coupled to the motherboard and disposed at a bottom portion of an outer wall of the reservoir to facilitate draining the reservoir in response to a signal from the motherboard that opens the emergency water valve. At least one chemical or water temperature sensor may be placed in the reservoir to provide one or more signals that cause the motherboard to open the emergency water valve in response to inappropriate liquid being provided to the reservoir and/or a decline of quality of the water in the reservoir. The cloud service may communicate with one or more mobile applications. The one or more mobile applications may perform providing instructions to the user, providing notifications and alerts to the user, and/or illustrating functioning of the self-watering plant container to the user.

The proposed system provides a plant container for semi-automatic self-watering using sub-irrigation with a sealed water reservoir, an air valve, and a sensor set, all controlled by a motherboard with a display; the motherboard has wireless Internet connectivity. Moisture sensors distributed at several levels in the soil, alone or combined with additional sensors, may be integrated with the motherboard to detect insufficient moisture level of the soil. Subsequently, the motherboard may cause opening of the air valve, interrupting the sealed vacuum state of the reservoir, and allowing the water flow from the reservoir into the soil through the openings at a bottom portion of an inner wall of the reservoir. Self-watering continues until the moisture level reaches the volumetric water content in percents based on the plant profile, which causes closing of the air valve, sealing the reservoir and interrupting the watering cycle. A water level sensor in the top portion of the reservoir uses a probe extending below the minimal water level suitable for functioning; the water level sensor detects insufficient and excessive water levels and prompts an owner to fill in the reservoir through the filling tube or a fill hole, while a drain at a bottom portion of an outer wall of the reservoir supports emergency draining for different reasons, such as the decline of water quality or an occasional use of inappropriate liquid.

Various aspects of system architecture and functioning are explained as follows.

1. Key components and assembly. The wireless plant container includes the following principal components:
   a. A reservoir (tank) occupying an outer part of the container, with a filling tube or a fill hole sealed by a stopper and located on top of the reservoir. The reservoir has multiple openings for the sub-irrigated watering at a bottom portion of an inner wall of the reservoir. Inner walls of the reservoir (the interior of the container) are filled with soil and host the plant. Usually, the reservoir is sufficiently filled with water and sealed; the air pressure inside the reservoir is low, which prevents water from flowing through the openings at the bottom.
   b. An air valve, such as a solenoid valve, on a top portion of the reservoir may be opened for air intake on a command from a motherboard, which increases the air pressure within the reservoir and causes the water to flow through the openings at the bottom, starting a watering cycle. Closing the air valve ends the watering cycle.
   c. An emergency water valve with a drain in the bottom portion of an outer wall of the reservoir allows for quick emptying of the reservoir by opening the water valve in case an unfit liquid or a contaminated water have been occasionally poured into the reservoir. The drain may also be used if the water quality declines due to various factors. Like in the case of the air valve, drain functioning is controlled by the motherboard.
   d. One or multiple capacitive (or other) moisture sensors may be distributed at different depths in the soil; the sensors may continuously monitor the moisture level of the soil. Moisture sensors may be mounted on PCB elements and connected to the motherboard as explained below.
   e. A water level sensor, capacitive, optical or based on other technologies, may be located inside the reservoir. An efficient construction of the water level sensor positions the sensor in the top portion of the reservoir, above the maximum height of the water surface for any plant profile compatible with the container and supplies the sensor with a probe that extends below the minimum water level allowing the sub-irrigated self-watering. In this way, the water level sensor may track both the lowest and the highest positions of the water surface in the reservoir and may determine both the reservoir refilling needs after enough watering has been performed and the water from the reservoir have evaporated through the soil and the fully refilled state of the reservoir.

f. Additional sensors mounted on the plant container may measure an outside temperature and humidity (or a room temperature and humidity for the indoor use), light, and multiple additional parameters to determine plant comfort level for different plant types (profiles). Chemical and water temperature sensors for ensuring the required water quality may be optionally placed into the reservoir.

g. The motherboard serves as a centralized power and control device of the system and may include
  i. a power unit (such as a rechargeable or non-rechargeable 3.7v li-ion battery, with an optional solar panel for an extended battery life);
  ii. a CPU unit;
  iii. a wireless local and Internet (including cellular and satellite) connectivity chipset;
  iv. wire, PCB, or wireless connections to valves and sensors; additional sensors may be mounted inside the motherboard;
  V. a status display (for example, a E ink screen).

The motherboard may be set up for a specific plant type, maintained in a wireless container. The motherboard may collect sensor data, display system status information and basic instructions for the user (plant owner or plant care service personnel), open and close air and water valves as necessary, transfer data to a cloud service (explained below), and receive commands, action recommendations, and installable upgrades from the cloud service.

h. The cloud service may include online database(s) and application server(s). The cloud service software may receive sensor readings from the moisture sensor and additional sensors, as explained in subsections d.-f., along with information about the motherboard actions and displays, and about user actions (such as refilling the reservoir or an emergency draining). The cloud service software may process and analyze the received information, obtain real-time and historical analytics, and recommend starts of new watering cycles (opening the valve), etc. The cloud service may send different types of notifications and alerts to the plant owner or to care personnel; the notifications may be received by mobile software applications and may be retained in a user portal, accessible via Internet browsers. The cloud service may be integrated with various components of a smart home (for example, with the climate, light control and camera components), may share data with a machine learning system integrating multiple owners of the self-watering plant container and may implement AI recommendation based on the machine learning of the integrated cloud services.

i. A mobile plant container software application of the owner (or other caregiver) may communicate with the cloud service, receive scheduled and on-demand plant status updates, analytics, alerts, instructions, care recommendations, and other information. The owner (or other caregiver) may use the mobile plant container software application to transfer instructions to the cloud service, which will activate permitted actions by the motherboard.

The owner (or other caregiver) may alter the scope of information and frequency of communications with the cloud service, may update watering preferences and frequency as needed, etc. The cloud software may control technical condition of the wireless plant container and generate maintenance and part replacement requests delivered to the mobile application.

2. Watering cycle. Usually, the reservoir of the wireless container is hermetically sealed: the air valve is closed and a stopper closes the filling tube (or the fill hole). Accordingly, air pressure inside the reservoir is low, and a vacuum effect prevents water in the reservoir from flowing into the soil through the openings at the bottom of the reservoir.

a. As the soil gradually dries up due to water evaporation through the soil, the motherboard may wirelessly transfer the readings of moisture sensors (and possibly the readings of additional sensors integrated with the motherboard, such as room or outside humidity) to the cloud service, where the system analytics component builds dependencies of the soil moisture level on the lapsed time since the previous watering cycle and on the environment conditions for the profile of the plants being maintained. The cloud service identifies the critical event when the soil moisture level approaches an undesirably low value and instructs the motherboard to start the new watering cycle by opening the air valve.

b. The motherboard opens the air valve; the air intake raises air pressure in the reservoir and causes water to flow from the reservoir into the soil through the openings at the bottom of the reservoir.

c. The watering cycle may continue as long as the air valve is open and the water level in the reservoir is sufficiently high. Eventually, the soil moisture profile is derived by the system analytics component based on the sensor readings and transferred by the motherboard to the cloud service. Eventually, the soil moisture profile approaches a sufficient soil moisture level for the predefined plant profile associated with the plant being maintained. In response to the soil moisture profile reaching a sufficient soil moisture level, the cloud service instructs the motherboard to close the air valve and finalize the current watering cycle; the water flow abates after the air valve is closed as the air pressure decreases due to the continued water flow in the absence of the air intake.

d. The analytics system may monitor the frequency and durations of water cycles and build real-time models and explanations of irregularities in water cycles and consumed water quantities, mapping irregularities in water cycles and consumed water quantities on the plant lifecycles and the environment and generating recommendations, such as improvements of the room climate and lighting, and of plant care methods.

3. Refilling reservoir. Once the water level sensor signals to the motherboard that there is insufficient water volume in the tank (the desired water level in the reservoir may be specific for the current plant type), the motherboard may display a warning for the owner (or other caregiver) on the status screen and the analytics component may generate another alarm delivered to the mobile application of the owner (or other caregiver), which may include additional instructions on the water supply, such as water quality, temperature, quantity, and the refilling process.

Upon receiving the alarm from the mobile application, the owner (or the plant care service personnel) may prepare a jug with the required volume of water of needed conditions, remove the stopper from the filling tube (or hole), pour water into the reservoir and reseal the filling tube/hole with the stopper. The water level sensor may automatically report to the system that refilling is complete.

4. Emergency draining. In the event of serious mistakes during refilling (wrong liquid, contaminated water, excessive refill volume, etc.), which may be detected by optional chemical and water temperature sensors placed in the reservoir (see item 1f) or may be discovered by the owner or the plant care service personnel, the owner or the care personnel may receive an alert from the system through the motherboard status display or the mobile application, and may immediately direct the system (and the motherboard as an executive mechanism) to open the water valve and drain all or part of the liquid from the reservoir. Emergency draining may be facilitated by a container and/or a hose to fit the drain and to collect the liquid flowing from the reservoir.

5. Miscellaneous functions may include addressing connectivity issues, issues with watering, monitoring battery replacement, recharging, display errors, and screen quality; providing log-term usage statistics and data search, AI-driven answers to owner questions, suggesting part replacements, upgrading motherboard firmware over the air, installing new versions of the cloud software and the mobile application, etc.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein offers an indoor and outdoor plant container for semi-automatic self-watering using sub-irrigation with a sealed water reservoir, an air valve, and a sensor set, all controlled by a motherboard having a display and wirelessly communicating with a cloud service, which subsequently communicates with a mobile application.

Figure 1:
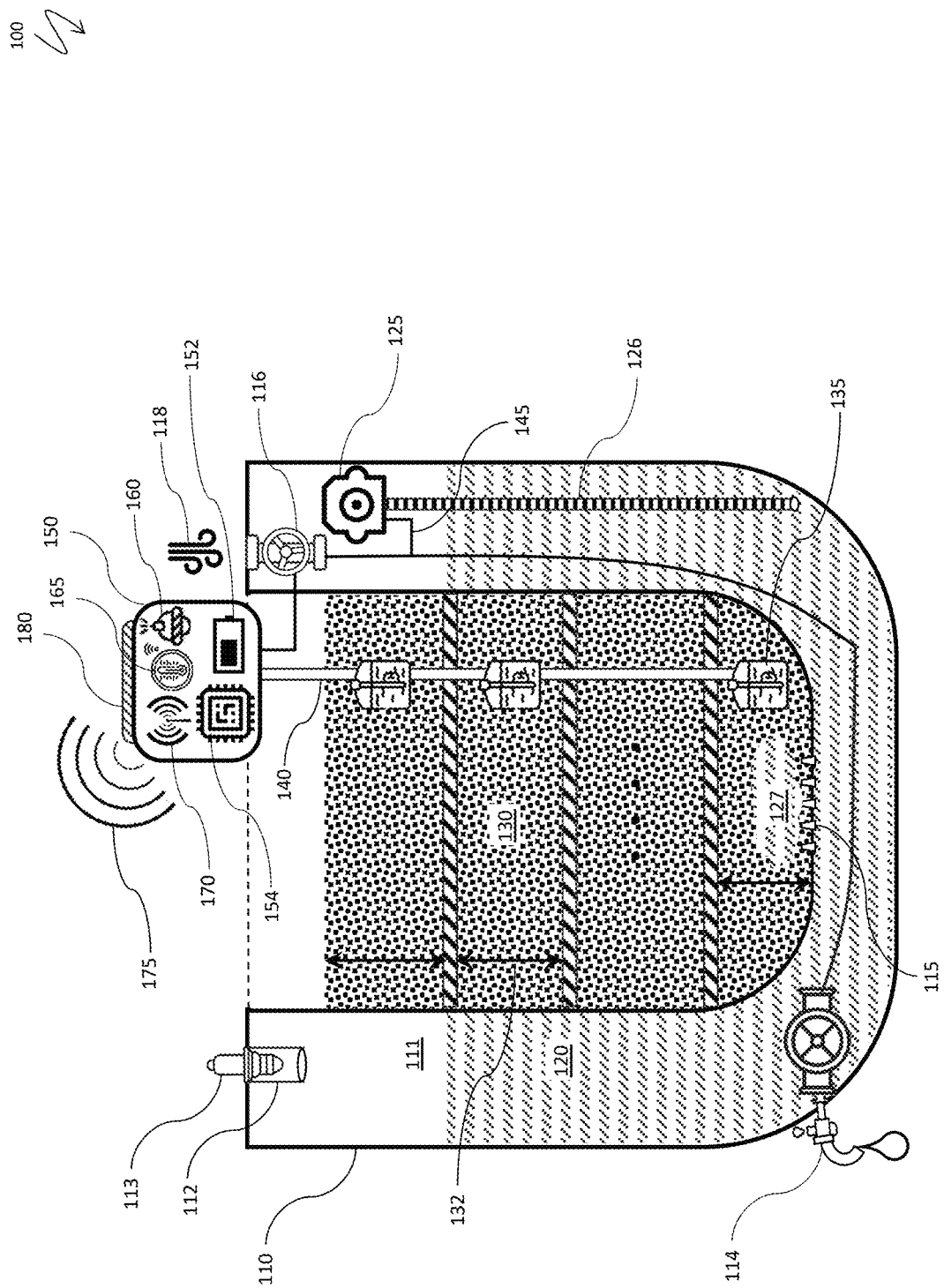
FIG. 1 is a schematic illustration of a semi-automatic wireless self-watering plant container with vacuum sealing, according to an embodiment of the system described herein.

FIG. 1 is a schematic illustration 100 of a semi-automatic wireless self-watering plant container 110 with vacuum sealing. A reservoir (tank) 111 occupies a cavity in an outer part of the container 110; a filling tube 112 sealed by a stopper 113 is located on top of the reservoir 111, whereas an emergency water valve with a drain 114 is located in a bottom portion of an outer wall of the reservoir 111. Note that instead of a filling tube, the reservoir 111 may have a fill hole, as explained elsewhere herein. An inner wall of the reservoir 111 has multiple openings 115 in a bottom portion of the inner wall for sub-irrigated watering. An automatically actuatable air valve 116 may open an air intake 118 into the reservoir 111 to start a watering cycle, which may be ended by closing air access to the reservoir 111.

Usually, the reservoir is filled with a sufficient volume of water 120; an optimal water volume may depend on the size of the container, the type (profile) of the plant, the type of soil, the temperature and humidity of the outside environment (or the room for the indoor use), and of other appropriate factors. A water level sensor 125 with a probe 126 may monitor the position of the water surface and alert an owner or a care personnel of the necessity to fill the reservoir 111 when the water volume becomes critically low. The water level sensor 125 may also notify an end of refilling when the water surface in the reservoir reaches an upper level recommended for a specific plant profile. During the watering cycle, water flows from the reservoir 111 through the openings 115, to provide water flow 127.

The inner portion of the reservoir 111 is filled with soil 130, conditionally (logically) subdivided into layers 132; each of the layers 132 may be supplemented with a soil moisture sensor 135. Note that there may only be a single soil moisture sensor 135.

The sensors 125, 135 may be connected to a motherboard 150 via PCB elements 140 or by a wire 145. The motherboard 150 hosts a power supply 152 (such as a rechargeable or replaceable 3.7v battery with an optional solar panel), a processor unit 154 and may include additional sensors, such as a light sensor 160 and a humidity and temperature sensor pack 165. The motherboard 150 may also include a Wi-fi unit 170, providing wireless connectivity 175 and a status display 180.

Figure 2:
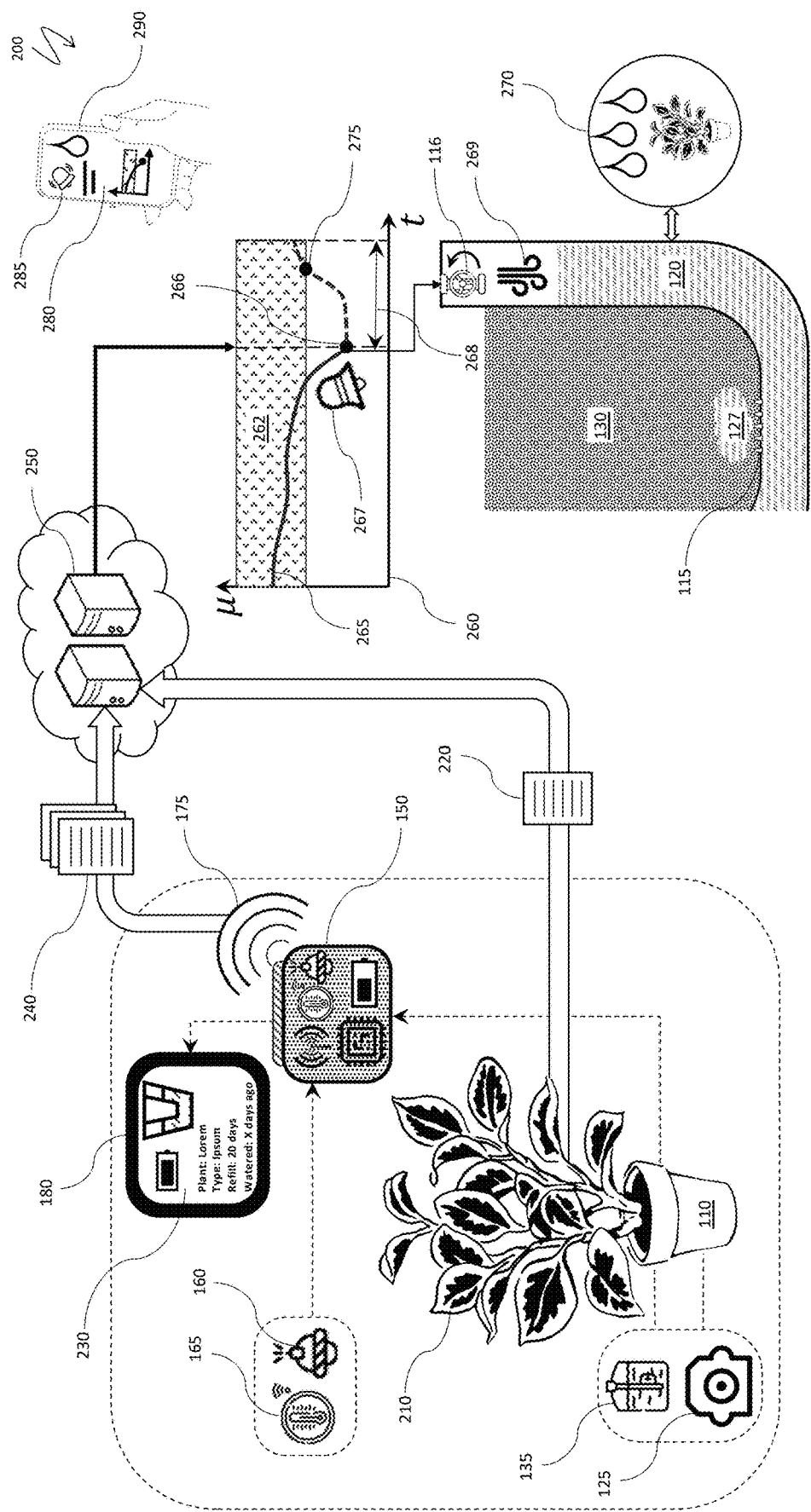
FIG. 2 is a schematic illustration of a sub-irrigated self-watering function, according to an embodiment of the system described herein.

FIG. 2 is a schematic illustration 200 of a sub-irrigated self-watering function. The plant container 110 for semi-automatic sub-irrigated self-watering hosts a plant 210 with a plant profile 220. Measurements of the water level sensor 125 and one or multiple soil moisture censors 135, along with indications of additional sensors, such as the light sensor 160 and the humidity and temperature sensor pack 165, are captured by the motherboard 150. The motherboard 150 displays a current status 230 of the plant container 110 and of the plant 210 on the status display 180. Status parameters may include battery state, reservoir filling state, plant name and type, the date of a last watering cycle, a projected time to refill, etc.

The motherboard 150 transfers captured parameters 240 of the plant container 110, the plant 210, and environment measurements to a cloud service 250 through the wireless Internet connection 175. The cloud service 250 includes data and application servers, as explained elsewhere herein (see, for example, subsections 1h, 2a of the Summary). Note that the plant profile data 220 may be uploaded to the cloud service 250 at the system setup phase.

A system analytics component 260 of the cloud service 250 continuously models a comfort zone 262 of soil moisture values (based on the volumetric water content in percents, which may depend on a profile of the plant 210, environmental parameters, and other factors) and builds a soil moisture graph 265. As long as a curve of the graph 265 remains within the comfort zone 262, no actions are taken. Once the analytics component 260 estimates that a soil moisture value 266 is too low and falls outside the comfort zone 262, the cloud service 250 initiates an alert 267 and transfers an action command to the motherboard 150 (not shown in this part of FIG. 2), which opens the air valve 116 and allows air intake 269. The increased air pressure over the water surface in the reservoir 111 forces the water flow 127 of the water 120 in the reservoir 111 through the openings 115 into the soil 130, as explained elsewhere herein (see, for example, FIG. 1 and corresponding text and Section 2 of the Summary), starting a watering cycle 270.

The soil moisture level increases through the watering cycle 270, as shown by dashed portion of the graph 265. The watering cycle 270 continues until the analytics component 260 estimates that a soil moisture level 275 has returned back to the comfort zone 262; subsequently, the cloud service 250 sends a command to the motherboard. 150 to close the air valve 116 and seal the reservoir 111, which ends water flow shortly after the air valve is closed as the air pressure abates due to continued water flow in the absence of the air intake, as illustrated by a right end of a watering time interval 268.

The cloud service 250 may produce illustrations and other content showing functioning of the analytics component 260 between and during watering cycles and may display the content in the mobile application 280 on a mobile device 290, including the notifications and alerts 285, and the instructions (see section 1i for explanations and other uses of the mobile application 280).

Figure 3:
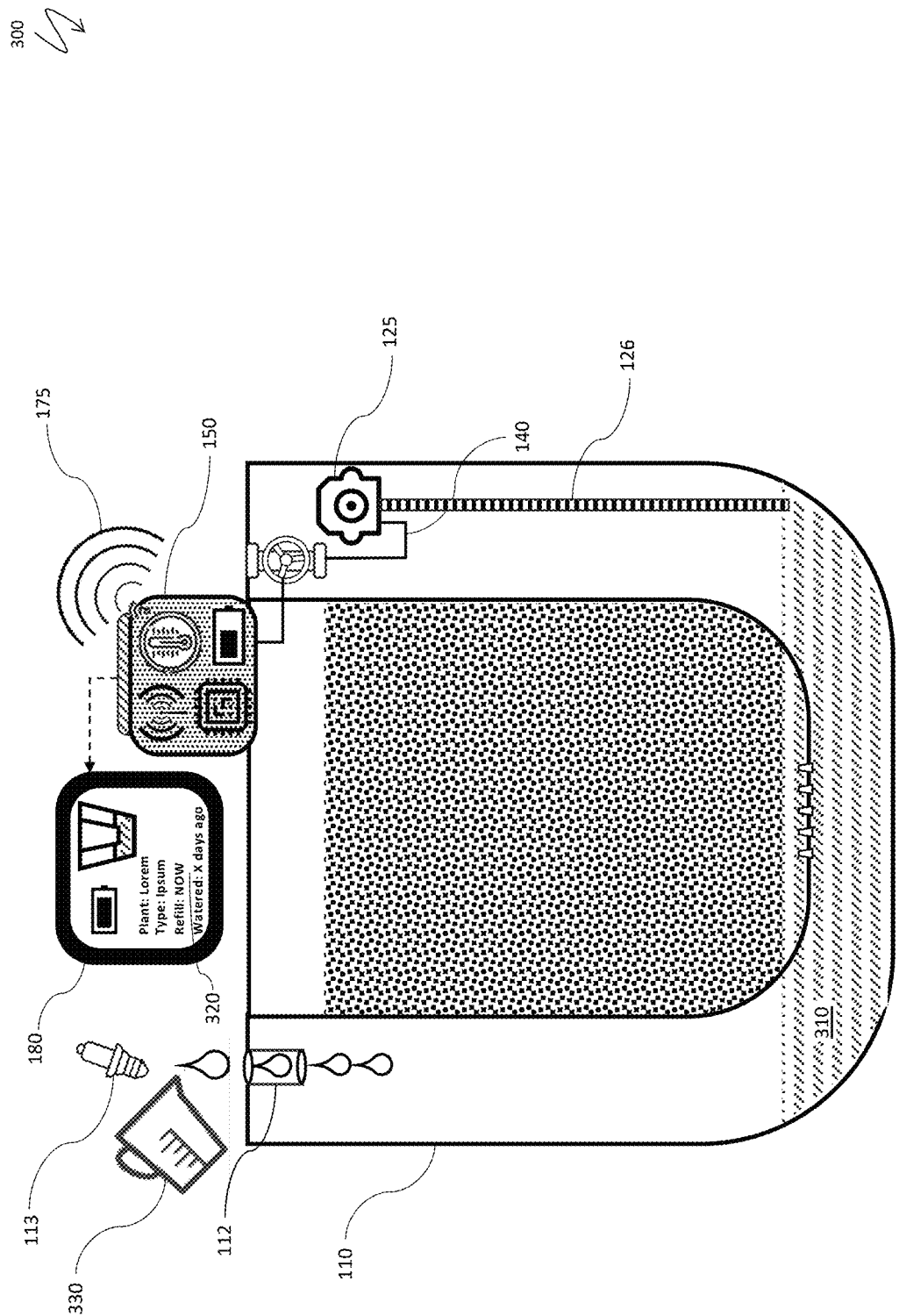
FIG. 3 is a schematic illustration of refilling a reservoir, according to an embodiment of the system described herein.

FIG. 3 is a schematic illustration 300 of refilling the reservoir 111. The water level sensor 125 with the probe 126 has detected a critically low water level in the reservoir 111, which is insufficient for subsequent watering cycles. An alarming indication is transferred via the wire connection 140 to the motherboard 150, which may display status 320 of the plant container on the display 180, requiring an immediate refill of the reservoir 111. The motherboard 150 may also transfer the alert to the cloud service 250 via the wireless Internet connection 175, which may further propagate the alert and the refill requirement to the mobile application 280 (see FIG. 2 and the accompanying text for more information about the cloud service 250 and the mobile application 280, which are not shown in FIG. 3).

In response to the reservoir refill requirement, the owner or the plant care personal may prepare a jug 330, open the filling tube 112 by removing the stopper 113, and pour water into the reservoir 111. A required refill volume may be secured by a size of the jug 330 and a water volume in the jug 330; a required refill volume may also be controlled by the water level sensor 125, as explained elsewhere herein (see FIG. 1 and the accompanying text). Note that instead of the filling tube 126, the reservoir 111 may have a fill hole, and the jug 330 may be replaced by another filling instrument such as a hose. After the reservoir 111 is filled, the stopper 113 is re-inserted in the filling tube 126 and to seal the reservoir 111.

Figure 4:
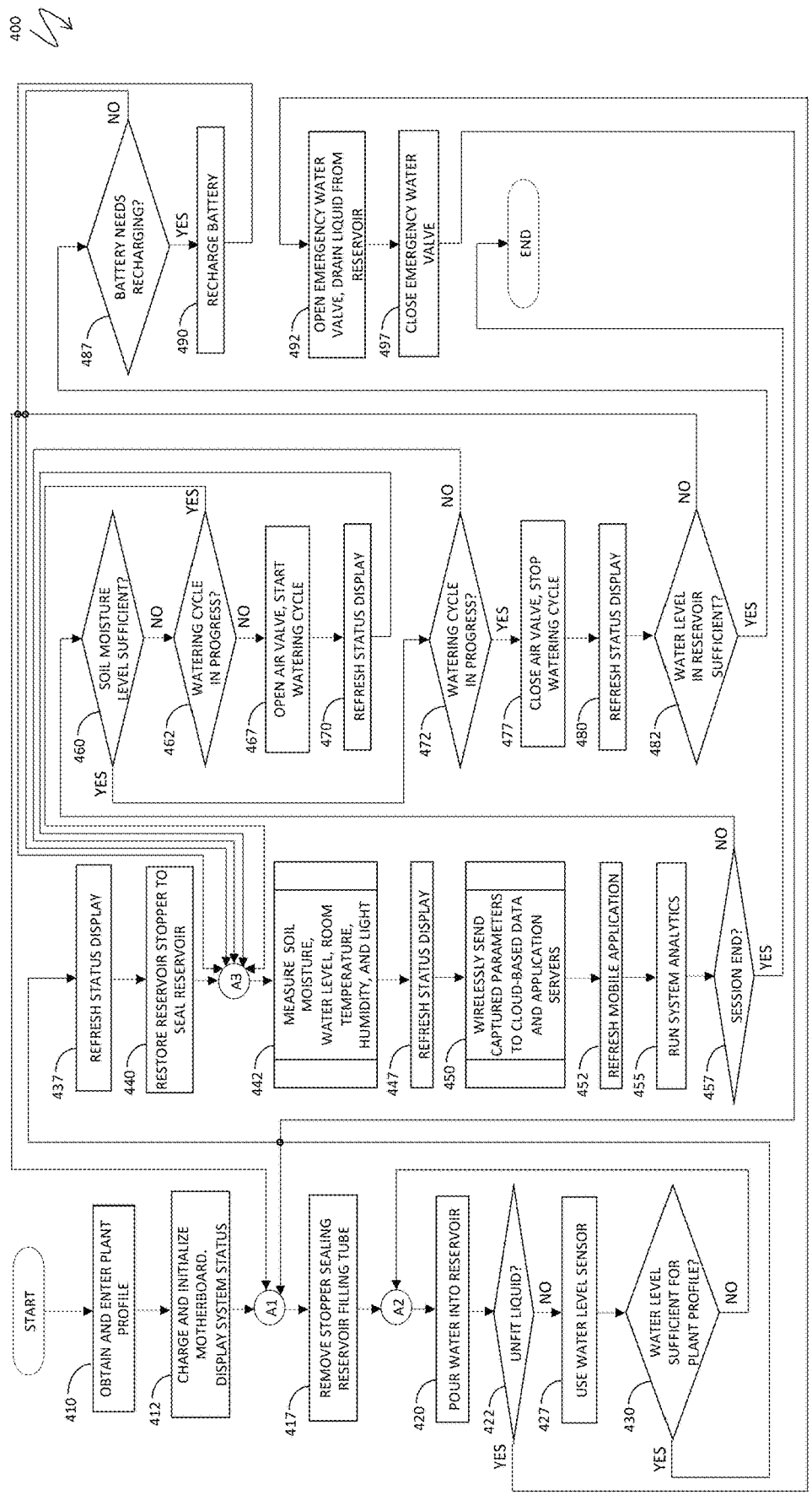
FIG. 4 is a system flow diagram illustrating system functioning in connection with semi-automatic wireless self-watering, refilling a reservoir, and emergency draining, according to an embodiment of the system described herein.

Referring to FIG. 4, a system flow diagram 400 illustrates system functioning in connection with semi-automatic wireless self-watering, refilling the reservoir, and emergency draining. Processing begins at a step 410, where the system obtains and enters a plant profile, as explained elsewhere herein (see, for example, FIG. 2 and the accompanying text). After the step 410, processing proceeds to a step 412, where the motherboard is charged and initialized and the initial system status is displayed on the status display. After the step 412, processing proceeds to a step 417, where an owner or other plant care personnel removes the stopper sealing the reservoir filling tube (see, for example, FIG. 3 and the accompanying text). After the step 417, processing proceeds to a step 420, where the owner or other plant care personnel pours water into the reservoir, as explained elsewhere herein. After the step 420, processing proceeds to a test step 422, where it is determined whether the liquid is unfit for watering the plant, as explained, for example, in more details in Section 4 of the Summary. If not, processing proceeds to a step 427, where a water level sensor or another mechanism is employed to monitor the water level (see, for example, FIG. 3 and the accompanying text). After the step 427, processing proceeds to a test step 430, where it is determined whether the water level (volume) in the reservoir is sufficient for the plant profile. If not, processing proceeds back to the step 420, which may be independently reached from the step 417; otherwise, processing proceeds to a step 437, where the status display is refreshed to indicate the filled reservoir. After the step 437, processing proceeds to a step 440, where the reservoir stopper is restored to the filling tube to seal the reservoir.

After the step 440, processing proceeds to a step 442, where the sensors measure soil moisture level and a reservoir water level and may also measure the temperature, air humidity, and lighting conditions of the environment (outdoor or indoor), as explained elsewhere herein (see, for example, FIG. 1 and the accompanying text). After the step 442, processing proceeds to a step 447, where the status display is refreshed as necessary. After the step 447, processing proceeds to a step 450, where the motherboard wirelessly sends the captured parameters (including sensor readings) to the cloud-based data and application server(s), as explained elsewhere herein. After the step 450, processing proceeds to a step 452, where the cloud service refreshes the mobile application (explained elsewhere herein) as necessary. The update at the step 452 may depend on the requested frequency of reports, scope of reported data, and other factors (see, for example, FIG. 2 and the accompanying text). After the step 452, processing proceeds to a step 455, where the application server runs a system analytics component. After the step 455, processing proceeds to a test step 457, where it is determined whether the session started at the step 410 has ended. If so, processing is complete; otherwise, processing proceeds to a test step 460, where it is determined whether the soil moisture level in the plant container is sufficient. If not, processing proceeds to a test step 462, where it is determined whether a watering cycle is in progress. If so, processing proceeds to the step 442, discussed above, which may be independently reached from the step 440; otherwise, processing proceeds to a step 467, where the air valve is opened and the watering cycle is started, as explained elsewhere herein (see, for example, FIG. 2 and the accompanying text). After the step 467, processing proceeds to a step 470, where the status display is refreshed to reflect the start of a new watering cycle. After the step 470, processing proceeds to the step 442, discussed above, which may be independently reached from the step 440 and the test step 462.

If it is determined at the test step 460 that the soil moisture level is sufficient, processing proceeds to a test step 472, where it is determined whether a watering cycle is in progress. If not, processing proceeds to the step 442, discussed above, which may be independently reached from the steps 440, 470 and the test step 462; otherwise, processing proceeds to a step 477, where the air valve is closed to stop the watering cycle stops (see, for example, FIG. 2 and the accompanying text). After the step 477, processing proceeds to a step 480, where the status display is refreshed to reflect the completion of a current watering cycle.

After the step 480, processing proceeds to a test step 482, where it is determined whether the water level in the reservoir is sufficient to continue sub-irrigated self-watering. If not, processing proceeds to the step 417 to perform a new reservoir refilling cycle (note that the step 417 may be independently reached from the step 412). If it is determined at the test step 482 that the water level in the reservoir is sufficient, processing proceeds to a test step 487, where it is determined whether the motherboard battery needs recharging. If not, processing proceeds to the step 442, which may be independently reached from the steps 440, 470 and the test steps 462, 472; otherwise, processing proceeds to a step 490, where the motherboard battery (or other power source) is recharged. After the step 490, processing proceeds to the step 442, which may be independently reached from the steps 440, 470 and the test steps 462, 472, 487.

If it is determined at the test step 422 that the liquid poured into the reservoir during refilling is unfit (see, for example, Section 4 of the Summary), processing proceeds to a step 492, where the emergency water valve is opened and the liquid is drained from the reservoir until the reservoir is emptied. After the step 492, processing proceeds to a step 497, where the emergency water valve is closed. After the step 497, processing proceeds to the step 417 to start a new cycle of refilling the reservoir. Note that the step 417 may be independently reached from the step 412 and the test step 482.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A self-watering plant container, comprising:
    a reservoir disposed in a cavity of an outside wall of the container and having an inner wall that holds soil for one or more plants placed in the plant container;
    a plurality of openings in a bottom portion of the inner wall of the reservoir;
    an automatically actuatable air valve disposed in a top portion of the reservoir, wherein opening the air valve causes water from the reservoir to flow through the openings to increase a moisture content of the soil and wherein closing the air valve causes negative air pressure to act on the water to prevent the water from flowing through the openings;
    a motherboard, coupled to the air valve and having a processor thereon with firmware that causes the air valve to open and close and having a display that displays system status information and instructions for a user;
    a cloud service that communicates with the motherboard to provide signals thereto that cause the motherboard to open and close the air valve; and
    at least one other sensor that provides signals to the motherboard, wherein the at least one other sensor is one of: a light sensor, a temperature sensor, or a humidity sensor and wherein the motherboard provides the signals to the cloud service indicating one or more measured values from the at least one other sensor and the cloud service includes an analytics component that determines an acceptable zone of operation for one or more plants in the plant container based on the moisture content of the soil, environmental factors provided by the at least one other sensor, and a profile of the one or more plants in the plant container and wherein the analytics component causes the motherboard to open the air valve in response to determining that the moisture content of the soil is outside the acceptable zone of operation and causes the motherboard to close the air valve in response to determining that the moisture content of the soil is within the acceptable zone of operation.

2. The self-watering plant container of claim 1, further comprising:
    at least one moisture sensor that provides a signal to the motherboard indicating a moisture content of the soil.

3. The self-watering plant container of claim 2, wherein the air valve is opened or closed based in part on the moisture content and on a profile of the one or more plants placed in the plant container.

4. The self-watering plant container of claim 3, wherein the moisture content is determined to be sufficient or insufficient based on the profile and wherein the profile is stored in the cloud service.

5. The self-watering plant container of claim 4, wherein data from the moisture sensor is transmitted by the motherboard to the cloud service.

6. The self-watering plant container of claim 5, wherein the cloud service provides a signal to the motherboard to open the air valve in response to the moisture content being insufficient.

7. The self-watering plant container of claim 6, wherein the motherboard provides the signal to open the air valve.

8. The self-watering plant container of claim 5, wherein the cloud service provides a signal to the motherboard to close the air valve in response to the moisture content being sufficient.

9. The self-watering plant container of claim 8, wherein the motherboard provides the signal to close the air valve.

10. The self-watering plant container of claim 1, wherein the analytics component monitors frequency and durations of water cycles and builds real-time models of irregularities in water cycles and consumed water quantities, maps irregularities in water cycles and consumed water quantities on the profile of the one or more plants in the plant container and the signals from the at least one other sensor and generates recommendations that include at least one of: adaptation to outdoor climatic conditions, adaptation to outdoor lighting conditions, improvements of room climate, improvements of room lighting, or alternative plant care methods.

11. The self-watering plant container of claim 1, further comprising:
   a water level sensor that indicates a water level of the reservoir.

12. The self-watering plant container of claim 11, wherein the display of the motherboard or a mobile application that communicates with the cloud service prompts a user to add water to the reservoir in response to a signal from the water level sensor indicating an insufficient amount of water in the reservoir.

13. The self-watering plant container of claim 12, wherein the reservoir includes either a filling tube or a filling hole disposed at a top portion of the reservoir to facilitate the user adding water to the reservoir and wherein the water level sensor provides a signal when filling is complete.

14. The self-watering plant container of claim 1, further comprising:
   an emergency water valve, coupled to the motherboard and disposed at a bottom portion of an outer wall of the reservoir to facilitate draining the reservoir in response to a signal from the motherboard that opens the emergency water valve.

15. The self-watering plant container of claim 14, wherein at least one chemical or water temperature sensor is placed in the reservoir to provide one or more signals that cause the motherboard to open the emergency water valve in response to at least one of:
   inappropriate liquid being provided to the reservoir or a decline of quality of the water in the reservoir.

16. The self-watering plant container of claim 1, wherein the cloud service communicates with one or more mobile applications.

17. The self-watering plant container of claim 16, wherein the one or more mobile applications perform at least one of: providing instructions to the user, providing notifications and alerts to the user, or illustrating functioning of the self-watering plant container to the user.

* * * * *